Patented Apr. 10, 1951

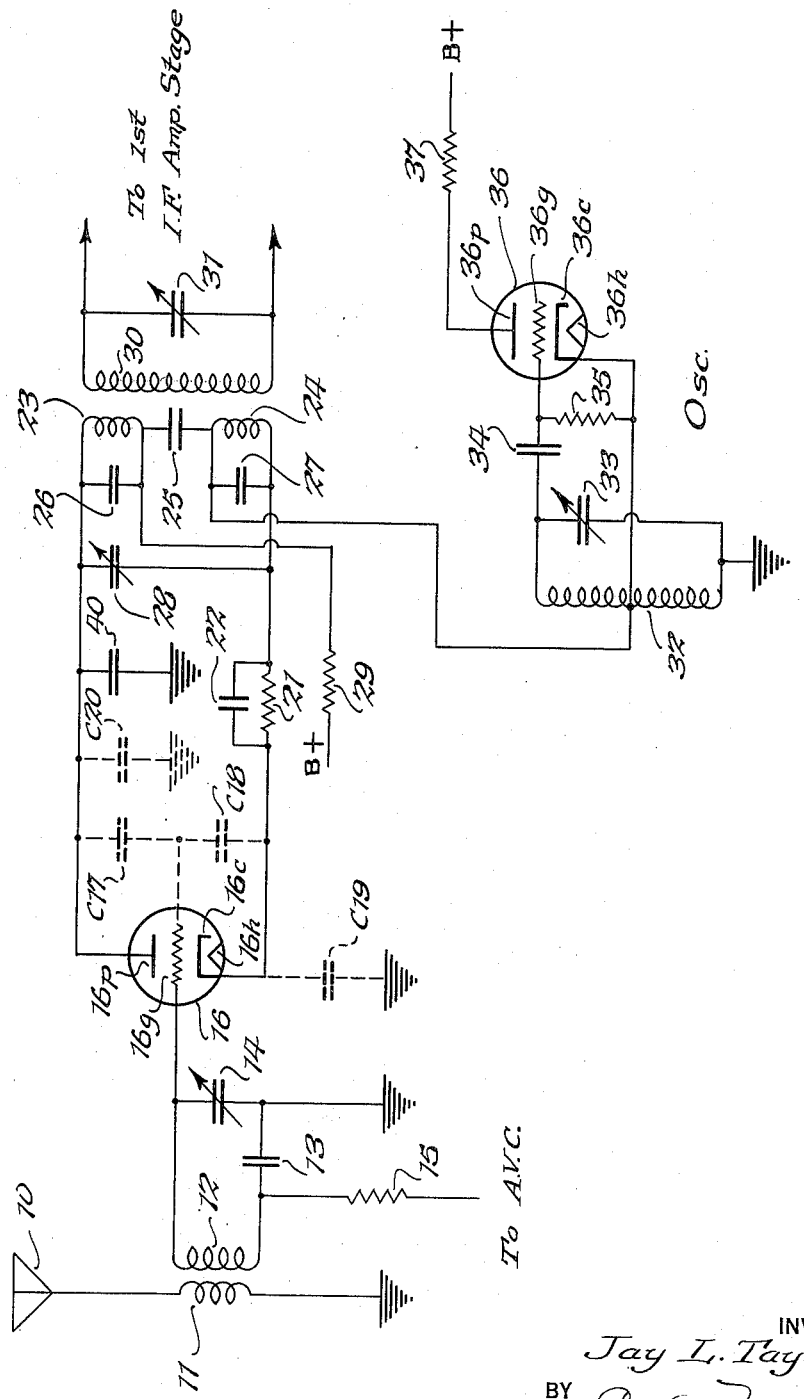

2,548,132

UNITED STATES PATENT OFFICE 2,548,132

SUPERHETERODYNE RECEIVER EMPLOYING TRIODE CONVERTERS

Jay L. Taylor, Jr., Los Angeles, Calif., assignor, by mesne assignments, to Sylvania Electric Products Inc., New York, N. Y., a corporation of Massachusetts Application July 17, 1945, Serial No. 605,548

1 Claim. (Cl. 250—20)

This invention relates to radio receiving apparatus, and more particularly to radio receivers of the superheterodyne type employing as the first tube thereof a triode converter fed with oscillator voltage derived from a separate oscillator.

It is an object of this invention to improve the Q of the input circuit to the triode converter.

It is a further object of this invention to provide a circuit which is at all times independent of input signal magnitude insofar as the Q of that circuit is concerned.

It is a further object of this invention to provide a converter tube circuit of the class described, in which the input and output circuits are tuned to widely different frequencies, whereby there is little or no tendency of the tube to oscillate, with improved Q of the input circuit.

It is a further object of this invention to provide a circuit of the class described which will afford maximum selectivity.

It is a further object of this invention to provide a circuit of the class described in which the coupling between input and output circuits of the converter is eliminated or substantially eliminated, while at the same time coupling between the various elements of the tube is still permitted.

The features of novelty which I believe to be characteristic of my invention are set forth with particularity in the appended claims. My invention itself, however, both as to its fundamental principles and as to its particular embodiments, will best be understood by reference to the specification and accompanying drawing, in which The single figure is a circuit diagram of so much of a superheterodyne embodying a triode converter as is necessary to an understanding of my invention.

Referring now more particularly to the drawing, 10 represents an antenna of any suitable type connected to one end of primary coil 11, the other end of which may be connected to ground. Coil 11 is coupled to secondary coil 12, which may form a part of the circuit of which the Q is desired to be improved.

The circuit may be closed through fixed condenser 13, which may be a blocking condenser of relatively large size, and through tuning condenser 14, and back to the opposite terminal of coil 12. Condenser 14 may be one section of a gang tuning condenser arranged to tune all of the circuits necessary for selection of desired signals, as is well known in the art.

The common point of condensers 13 and 14 may be connected to ground, and the ungrounded side of condenser 13 may be connected through resistance 15 to any suitable form of automatic volume control circuit well known in the art and not shown.

The ungrounded side of condenser 14 may be connected to control electrode 16g of triode converter 16, which may have heater 16h, cathode 16c, and anode 16p. Anode 16p may be connected to feed coil 23, which may be shunted by small trimming condenser 26, and through resistance 29 to B+.

Cathode 16c may be connected through suitable resistance 21 shunted by condenser 22 to one terminal of coil 24, and thence to cathode 36c of oscillator tube 36. Coil 24 may be shunted by small trimming condenser 27, and coils 23 and 24 may be connected through condenser 25 as shown.

Tuning condenser 28 may be connected between anode 16p and terminal of resistance 21 remote from cathode 16c.

Coils 23 and 24 may be both coupled to coil 30, which may be shunted by tuning condenser 31. The voltage developed across condenser 31 may be applied to the input circuit of the first intermediate frequency amplifier stage as indicated by the arrows. Since intermediate frequency amplifiers are well known in the art and form per se no part of this invention, no further description of the intermediate frequency amplifier is believed to be necessary, nor is it thought necessary to show the detector, A. V. C. system, audio amplifier and loud speaker customarily used.

The oscillator circuit controls the oscillator tube 36, which may have heater 36h, cathode 36c, control electrode 36g, and anode 36p, the anode being connected through resistance 37 to B+. The input circuit of the oscillator may comprise inductance 32 shunted by tuning condenser 33, which may be another section of the gang tuning condenser which tunes desired signals.

The midpoint of coil 32 may be connected to cathode 36c, grid condenser 34 may be interposed between control electrode 36g and top end of inductance 32, and the usual grid resistor 35 may be connected between control electrode 36g and cathode. The lower end of inductance 32 may be grounded as indicated.

In order to isolate the input and output circuits of the triode converter it is necessary that the values of the condensers associated with tube 16 satisfy the following equation:

$$C17 \times C19 = C18 \times C20$$

When this condition occurs, the output circuit reflects no impedance across the tube or otherwise to change the tuning or Q of the input circuit. These condensers indicated in dotted lines in the drawing as grid-plate capacity C17, plate-ground capacity C20, cathode-grid capacity C18, and cathode-ground capacity C19, are ordinarily not present as physical condensers, but are usually inherent in the wiring, the tube elements, and the mechanical parts.

The equation may best be satisfied by adding an additional physical condenser 40, which may or may not be adjustable, in parallel with capacity C20 or C19 (shown as in parallel with capacity C20), as may be found necessary by measurement or by trial. When such capacity is added in parallel with condenser C20 or C19, the tuning range of the input circuit is not affected. Coils 23 and 24, connected through condenser 25, are tuned ordinarily by adjusting the value of condenser 28.

With injection of the oscillator voltage as shown, it may be desirable at some frequencies to use condensers 26 and 27 (and which may otherwise be omitted), which may also contribute toward tuning the circuit. Condensers 26 and 27, if used, will ordinarily be equal in value and will be large compared with the value of condenser 28. It is desirable to have these latter three condensers large compared to condensers C20 and C19 so that any adjustment of capacities C20 or C19 will not appreciably change the tuning of circuits 23, 25, 24, and 28.

When it is desired to use a single coil primary in place of the two coils 23 and 24, then the B and C voltages may be introduced through chokes connected to anode 16p and cathode 16c of tube 16.

In the specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim:

In a radio receiver of the superheterodyne type employing a triode converter having a cathode, an anode and a control electrode with inherent capacities between electrodes and ground, and a separate oscillator for supplying heterodyning voltage to said converter, in combination, a tunable input circuit connected between ground and the control electrode of said converter, a tuning element in the output circuit, said output circuit being tuned to a frequency substantially different from the frequency of the input circuit, said cathode being maintained at an alternating current potential off ground, and a physical condenser in parallel with the anode ground capacity, of such value that the total control electrode-anode capacity times the total cathode-ground capacity equals the total electrode-cathode capacity times the total anode-ground capacity, an oscillator, and a connection for supplying heterodyning voltage from said oscillator to the output circuit of said converter.

JAY L. TAYLOR, Jr.

REFERENCES CITED

The following references are of record in the file of this patent:

UNITED STATES PATENTS

| Number | Name | Date |
|---|---|---|
| 1,688,842 | Weagant | Oct. 23, 1928 |
| 1,963,610 | Mathieu | July 31, 1934 |
| 2,107,395 | Schlesinger | Feb. 8, 1938 |
| 2,228,081 | Herold | Jan. 7, 1941 |
| 2,296,107 | Kimball | Sept. 15, 1942 |
| 2,309,031 | Worchester | Jan. 19, 1943 |
| 2,370,758 | Thompson | Mar. 6, 1945 |
| 2,430,835 | Strutt et al. | Nov. 11, 1947 |